United States Patent [19]
Schmidt et al.

[11] Patent Number: 6,011,016
[45] Date of Patent: Jan. 4, 2000

[54] FAT SOLUBLE VITAMIN EMULSIONS SUITABLE FOR SPRAYING ONTO FOODSTUFFS

[75] Inventors: Douglass N. Schmidt, Gross Ile, Mich.; Melissa Mack, South Jordan, Utah

[73] Assignee: BASF Corporation, Mount Olive, N.J.

[21] Appl. No.: 08/956,866

[22] Filed: Oct. 23, 1997

[51] Int. Cl.$^7$ ...................................................... A61K 31/70
[52] U.S. Cl. .............................. 514/23; 514/774; 426/72; 426/657; 426/658
[58] Field of Search ..................................... 426/657, 658, 426/72; 514/23, 774

[56] References Cited

U.S. PATENT DOCUMENTS

| | | |
|---|---|---|
| 3,558,323 | 1/1971 | Cannalonga et al. . |
| 5,126,162 | 6/1992 | Eraumus ................................. 426/657 |
| 5,510,130 | 4/1996 | Holtz et al. ............................... 426/93 |

*Primary Examiner*—Elli Peselev
*Attorney, Agent, or Firm*—Barbara V. Maurer

[57] ABSTRACT

The present invention relates to a stable, tasteless fat soluble vitamin emulsion composition which can be sprayed on foodstuffs at room temperature, particularly ready-to-eat breakfast cereal, for the purpose of vitamin fortification of said foodstuffs.

3 Claims, No Drawings

FAT SOLUBLE VITAMIN EMULSIONS SUITABLE FOR SPRAYING ONTO FOODSTUFFS

FIELD OF INVENTION

The present invention relates to a stable, tasteless fat soluble vitamin emulsion composition which can be sprayed on foodstuffs, particularly ready-to-eat breakfast cereal, for the purpose of vitamin fortification of said foodstuffs.

BACKGROUND

Vitamin fortification of foodstuffs is a common practice in the food industry. Ready-to-Eat (RTE) cereal manufacturers are especially concerned with vitamin fortification of their products. See, "Breakfast Cereals And How They are Made", edit by R. B. Fast and E. F. Caldwell, Chapter 7, Pages 197–209 and Chapter 10, Pages 275–277 which discuss the importance of vitamin fortification and spraying vitamins as a method of vitamin fortification. Further, U.S. Pat. No. 3,558,323 to Hoffmann-LaRoche (US '323) discloses a vitamin composition suitable for fortifying fluid whole milk and spray dried powdered skim milk. Said composition comprises: (a) 47 to 92% of a reacted (i.e. modified) gelatin made by reacting gelatin, ascorbic acid, and sorbitol, (b) 5 to 15% of an edible saturated oil such as coconut oil, and (c) 5 to 50% of a fat soluble vitamin. US '323 discloses that the gelatin used to form the reacted (i.e. modified) gelatin is Type A or B. The reacted gelatin product is not a true gelatin, it is a polypeptide material having essentially zero bloom and a molecular weight of 1200 to 2500 and a viscosity of 5 to 10 millipoises.

Vitamin fortification is also accomplished by incorporating the vitamin into the cereal. Specifically, U.S. Pat. No. 5,368,870 (General Mills) states that topical vitamin application often results in substantial chemical and physical loss of vitamins and also causes off flavors. US '870 describes a method for incorporating beta carotene into a cooked cereal mass prior to piece formation. U.S. Pat. No. 5,270,063 (Kellogg) discloses incorporating beta carotene into cereal products in the form of water insoluble beadlets. The beta carotene is encapsulated in gelatin to form the beadlets. Said beadlet is then added to bulk cereal starting material during the cooking process or when the process is complete.

Clearly there is a need in the art for a vitamin composition that can be sprayed onto foodstuffs at room temperature, which does not have the stability and taste problems associated with the prior art. Applicants have surprisingly discovered a fat soluble vitamin emulsion that is stable and free of taste problems.

SUMMARY

A sprayable fat soluble vitamin emulsion composition comprising:

(a) 1 to 20% of a fat soluble vitamin blend
(b) 2 to 6% gelatin
(c) 15 to 45% sodium ascorbate

DETAILED DESCRIPTION

A sprayable fat soluble vitamin emulsion composition comprising:

(a) 1 to 20% of a fat soluble vitamin blend
(b) 2 to 6% gelatin
(c) 15 to 45% sodium ascorbate Preparing the Sprayable Fat Soluble Vitamin Emulsion of the Present Invention The sprayable vitamin emulsion is prepared according to methods known to those skilled in the art by blending elements (a), (b), and (c) in $H_2O$. Specifically, the gelatin is dissolved in @ 40° C. water with vigorous mixing. The fat soluble vitamin blend and the sodium ascorbate are added as the dissolved gelatin cools to room temperature while remaining sprayable.

Element (a)
The Fat Soluble Vitamin Blend

The fat soluble vitamin blend contains fat soluble vitamins, vegetable oil carriers, and emulsifiers. The fat soluble vitamins are selected from A, beta carotene, D, E and K. Said vitamins are available in concentrated form from BASF Corporation, Mt. Olive, N.J. The preferred fat soluble vitamins are A, D, and E. 10–70% of said concentrated vitamin is blended with 0–30% of a vegetable oil carrier to prepare a vitamin/carrier blend suitable for use in a sprayable emulsion. Suitable vegetable oil carriers include, but are not limited to, corn oil, cottonseed oil, peanut oil, soybean oils, canola oil, palm or coconut oil.

Said vitamin/carrier blend is then blended with emulsifiers. Said emulsifiers include, but are not limited to, propylene glycol, mono and di glycerides, monoleates, dimethylpolysiloxane (substantially free from hydrolyzable chloride and alkoxy groups), emulsifiers and defoamers, polyethylene glycol, polyoxyethylene 40 monostearate, propylene glycol alginate, silicon dioxide and sorbitan monostearate, glyceryl caprate, glyceryl oleate, hydrogenate cottonseed glyceride, mono & di glycerides of fatty acids, polyethylene glycol, propylene glycol and lecithin. The preferred emulsifiers are propylene glycol and mono and di glycerides.

Specifically, the fat soluble vitamin blend is prepared by blending 40 to 70% vitamin/carrier blend with 30 to 60% emulsifiers. Preferably, 50 to 60% vitamin/carrier blend is blended with 40 to 50% emulsifiers, and more preferably, 55 to 60% vitamin/carrier blend is blended with 40 to 45% emulsifiers to prepare the fat soluble vitamin blends.

Finally, the fat soluble vitamin blend prepared as described hereinabove is present in the sprayable emulsion at a level of 1 to 20%, preferably, 5 to 15% and most preferably at a level of 5 to 10%.

Element (b)
Gelatin

Gelatin useful in the practice of the present invention includes, but is not limited to, Type A and B gelatins, gelatin from all animals, including pork, beef and fish. Preferred gelatin is derived from fish.

The gelatin is present in the sprayable emulsion at a level of 2 to 6%, preferably, 2 to 3% and most preferably at a level of 2.5 to 3.0%.

Element (c)
Sodium Ascorbate

Sodium ascorbate useful in the practice of the present invention is available from BASF Corporation, Mt. Olive, N.J.

The sodium ascorbate is present in the sprayable emulsion at a level of 15 to 45%, preferably, 25 to 40% and most preferably at a level of 30 to 38%.

Elements (a), (b) and (c), are optionally blended with water soluble starch and food grade defoamers.

Water soluble starch useful in the practice of the present invention includes, but is not limited to, modified food starch, preferably derived from corn.

The starch is present in the emulsion at a level of 0.5 to 5%, preferably, 1 to 4% and most preferably at a level of 3 to 4%.

Food Grade defoamers useful in the practice of the present invention include, but are not limited to, silicone based defoamers, dimethylpolysiloxane (substantially free from hydrolyzable chloride and alkoxy groups), polyethylene glycol, polyoxyethylene 40 monostearate, propylene glycol alginate, silicon dioxide and sorbitan monostearate. Preferred defoamers are Dow Corning's polydimethylsiloxane/silica blends. The defoamer is present in the sprayable emulsion at a level of 0 to 0.1%, preferably, 0 to 0.05% and most preferably at a level of 0.02 to 0.03%.

The present invention is illustrated by the following non limiting examples:

EXAMPLE 1
Sprayable Emulsion Formulation

| INGREDIENT | % |
|---|---|
| Water | 53.96% |
| Gelatin | 2.50% |
| Defoamer (Dow polydimethylsiloxane/silica blends | 0.05% |
| Sodium Ascorbate | 35.97% |
| Starch Blend (modified food starch) | 4.43% |
| Vitamin A/D (fat soluble vitamin) blend* | 3.09% |

*Fat soluble vitamin blend = 44.517% fat soluble vitamins and 0% vegetable oil carrier, 31.700 & propylene glycol and mono and diglycerides of fatty acids to add up to 100%.

EXAMPLE 2
Sprayable Emulsion Formulation

| Ingredient | % |
|---|---|
| Emulsion Formulation | |
| Water | 54.9 |
| Gelatin (Calf Skin Type B-High Bloom) | 6 |
| Defoamer (Dow ANTIFOAM 1500) | 0.1 |
| Sodium Ascorbate | 15 |
| Food Starch (Food Starch with B12 and B1) | 4 |
| Vitamin Blend* | 20 |
| *The vitamin blend is prepared accordingly | |
| *Vitamin Blend | |
| Fat Soluble Vitamins (Vitamins (500%)/Vegetable Oil Carrier (20%) | 70 |
| Propylene Glycol (CAPTEX) | 15 |
| Mono & Diglycerides (ATMUL 695K | 25 |

EXAMPLE 3
Sprayable Emulsion Formulation

| Ingredient | % |
|---|---|
| Emulsion Formulation | |
| Water | 51.5 |
| Gelatin (Pork Skin Type A - Low Bloom) | 2.5 |
| Sodium Ascorbate | 45 |

| Ingredient | % |
|---|---|
| Vitamin Blend* | 1 |
| *The vitamin blend is prepared accordingly: | |
| *Vitamin Blend | |
| Fat Soluble Vitamins (Vitamins (31%)/Vegetable Oil Carrier (9%) | 40 |
| Glycol Oleate (Drewmulse) | 25 |
| Propylene Glycol (Captex) | 40 |

EXAMPLE 4
Preferred Sprayable Emulsions

| Ingredient | % |
|---|---|
| Emulsion Formulation | |
| Water | 50.64 |
| Gelatin (Fish) | 3 |
| Defoamer (Dow Antifoam 1500) | 0.06 |
| Sodium Ascorbate | 36 |
| Food Starch | 3.5 |
| Vitamin Blend* | 6.8 |
| *The vitamin blend is prepared accordingly: | |
| *Vitamin Blend | |
| Fat Soluble (Vitamin (20%)/Vegetable Oil Carrier (36%)) | 56 |
| Propylene Glycol (CAPTEX) | 30 |
| Mono & Diglycerides (ATMUL 69K) | 14 |

The emulsion is sprayed onto foodstuffs, particularly cereal, according to methods known to those skilled in the art. For example, See, "Breakfast Cereals And How They are Made", edit by R. B. Fast and E. F. Caldwell, Chapter 7, Pages 197–209 and Chapter 10, Pages 275 –277 which discuss the importance of vitamin fortification and spraying vitamins as a method of vitamin fortification.

We claim:

1. A sprayable fat soluble vitamin emulsion composition comprising:
   (a) 1 to 20% of a fat soluble vitamin blend
   (b) 2 to 6% gelatin
   (c) 15 to 45% sodium ascorbate.

2. A sprayable fat soluble vitamin emulsion composition comprising:
   (a) 5 to 15% of a fat soluble vitamin blend
   (b) 2 to 3% gelatin
   (c) 25 to 40% sodium ascorbate.

3. A sprayable fat soluble vitamin emulsion composition comprising:
   (a) 5 to 10% of a fat soluble vitamin blend
   (b) 2.5 to 3% gelatin
   (c) 30 to 38% sodium ascorbate.

* * * * *